US006622813B2

(12) United States Patent
Matz et al.

(10) Patent No.: US 6,622,813 B2
(45) Date of Patent: Sep. 23, 2003

(54) HYBRID STEER-BY-WIRE WITH MECHANICAL LINK

(75) Inventors: Steve Matz, Holly, MI (US); Craig A Hennings, Washoe Valley, NV (US); Scott A. Millsap, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/915,933

(22) Filed: Jul. 26, 2001

(65) Prior Publication Data

US 2003/0019670 A1 Jan. 30, 2003

(51) Int. Cl.[7] .............................. B62D 5/04; B62D 7/06
(52) U.S. Cl. ...................... 180/411; 180/402; 180/413
(58) Field of Search ............................. 180/411, 412, 180/413, 402

(56) References Cited

U.S. PATENT DOCUMENTS

| | | | |
|---|---|---|---|
| 1,208,450 A | 12/1916 | Austin | |
| 2,109,418 A | 2/1938 | Fuller | 180/79.1 |
| 3,572,458 A | 3/1971 | Tax | 180/79.1 |
| 4,263,979 A | 4/1981 | Sturgill | 180/79.1 |
| 4,877,098 A | 10/1989 | Asanuma | 180/79.1 |
| 4,880,074 A | 11/1989 | Matsumoto | 180/142 |
| 4,943,758 A * | 7/1990 | Tsurumiya | 318/504 |
| 5,002,142 A | 3/1991 | Klosterhaus | 180/79.1 |
| 5,022,476 A | 6/1991 | Weege | 180/6.5 |
| 5,026,081 A | 6/1991 | Bauer | 280/91 |
| 5,145,022 A * | 9/1992 | Kido | 180/412 |
| 5,154,437 A | 10/1992 | Inagaki et al. | 280/91 |
| 5,207,287 A * | 5/1993 | Sano et al. | 180/412 |
| 5,257,191 A * | 10/1993 | Takehara et al. | 701/43 |
| 5,323,866 A | 6/1994 | Simard et al. | 180/6.28 |
| 5,347,458 A | 9/1994 | Serizawa et al. | 364/424.05 |
| 5,511,629 A | 4/1996 | Vogel | 180/79.3 |
| 5,653,304 A | 8/1997 | Renfroe | 180/402 |
| 6,275,754 B1 * | 8/2001 | Shimizu et al. | 701/41 |

* cited by examiner

Primary Examiner—Kevin Hurley
(74) Attorney, Agent, or Firm—Michael D. Smith

(57) ABSTRACT

A hybrid steer-by-wire and mechanical steering system for a vehicle includes two subsystems. The first subsystem connects a steering wheel with a mechanical link adapted to turn a first wheel of the vehicle. The second subsystem has an electro-mechanical actuator adapted to turn a second wheel of the vehicle. An electronic controller adapted to receive information indicative of the positions of the steering wheel and the first wheel controls the electro-mechanical actuator to thereby control the position of the second wheel.

20 Claims, 2 Drawing Sheets

HYBRID STEER-BY-WIRE WITH MECHANICAL LINK

BACKGROUND

In conventional mechanical steering systems with hydraulic or electric assist, vehicle design is typically constrained by the need to mount a rack and pinion gear system laterally across the vehicle, generally near the engine and transmission. This uses valuable space under the hood that designers would like to use for other purposes. However, conventional steering systems are robust and relatively fault-tolerant.

In steer-by-wire systems, the mechanical drive connection between the steering wheel and the steered vehicle wheels can be separated. Typically, the wheels are steered with an electric powered actuator according to an input signal obtained from a sensor that is associated with a steering wheel.

It is desirable to provide a system with some of the advantages of a steer-by-wire system while maintaining the simplicity and relatively fault-tolerant nature of a conventional steering system.

SUMMARY

A hybrid steer-by-wire and mechanical steering system for a vehicle includes two subsystems. The first subsystem connects a steering wheel with a mechanical link adapted to turn a first wheel of the vehicle. The second subsystem has an electromechanical actuator adapted to turn a second wheel of the vehicle. An electronic controller adapted to receive information indicative of the positions of the steering wheel and the first wheel controls the electromechanical actuator to thereby control the position of the second wheel.

DESCRIPTION OF PREFERRED EMBODIMENTS

Figure 1:
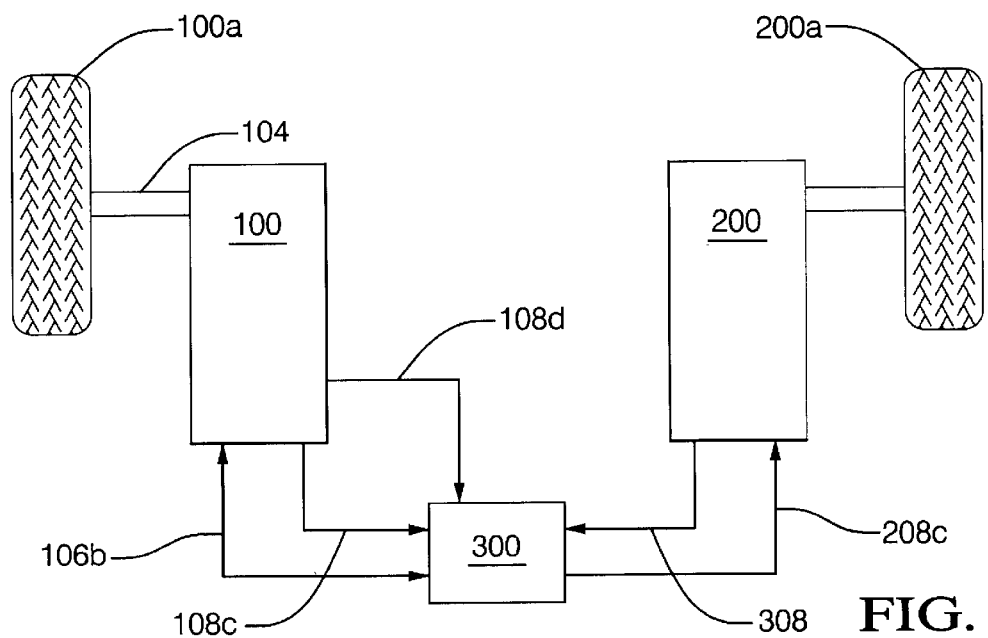
FIG. 1 is a generalized schematic illustration of a hybrid steer-by-wire system.

As shown in FIG. 1, a hybrid steer-by-wire system is generally indicated by the reference numeral 10 and comprises a first subsystem 100, a second subsystem 200, and an electronic controller 300 in signal communication therebetween. The first subsystem 100 is adapted to turn a first wheel 100a of a vehicle and the second subsystem 200 is adapted to turn a second wheel 200a of the vehicle. The electronic controller 300 is in signal communication with the first subsystem 100 by way of the signal paths designated by the reference numerals 106b, 108c and 108d, and with the second subsystem 200 by way of the signal paths designated by the reference numerals 208c, 208d and 308. The electronic controller 300 is adapted to receive information from the first subsystem 100 indicative of the position of the first wheel 100a and to control the position of the second wheel 200a in accordance therewith. A first mechanical link 104 connects the first subsystem 100 to the first wheel 100a, and a second mechanical link 206 connects the second subsystem 200 to the second wheel 200a.

Figure 2:
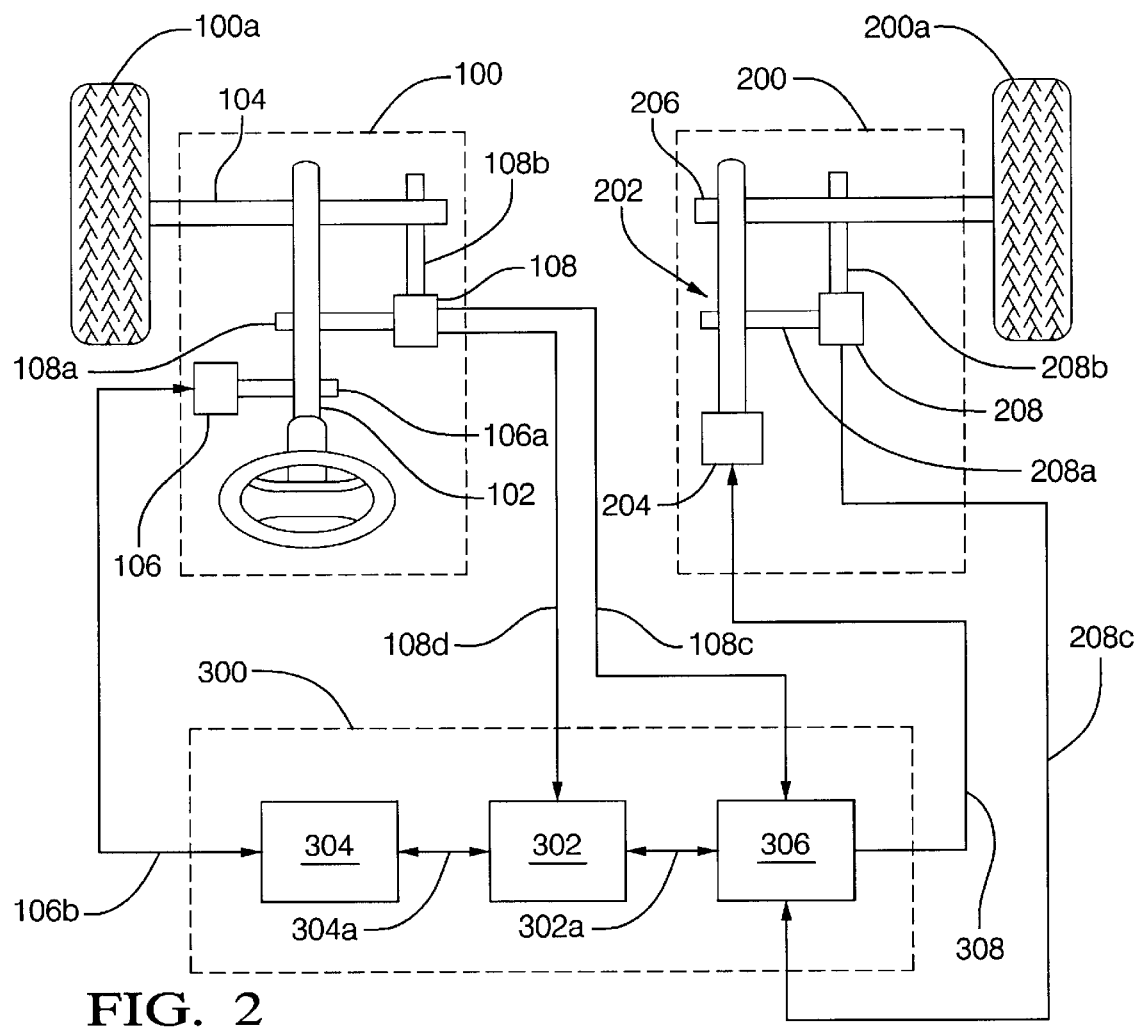
FIG. 2 is a schematic illustration in greater detail of the system of FIG. 1.

Referring now to FIG. 2, the first subsystem 100 of the system 10 comprises a steering column 102 connected to the first mechanical link 104, which, in turn, is connected to the first wheel 100a. Rotation of the steering column 102 causes a change in position of the first mechanical link 104, which, in turn, causes a change in position of the first wheel 100a.

The first subsystem 100 also includes a motor 106 for providing steering column torque assist and position control. The motor 106 is connected by first gear 106a to the steering column 102. The motor 106 is connected in signal communication with the electronic controller 300 by the signal path designated by the reference numeral 106b. The motor 106 is operative to provide steering assist torque at the steering column 102 to assist an operator of the vehicle, as well as to provide position control for automated steering under the command of the electronic controller 300. A steering wheel (not shown) is coupled to the end of the steering column furthest from the first wheel 100a, for use by the operator of the vehicle.

The first subsystem 100 further includes first and second redundant sensors 108 for measuring steering column position, the first connected by second gear 108a to the steering column 102, and the second connected by third gear 108b to the first mechanical link 104. First sensor 108 is connected in signal communication to the electronic controller 300 by the signal path designated by the reference numeral 108c, and second sensor 108 is connected in signal communication to the electronic controller 300 by the signal path designated by the reference numeral 108d, and are each operative to measure steering column position and first mechanical link position and to provide such measurements to the electronic controller 300.

The second subsystem 200 is comprised of an electromechanical actuator 202 including at least one motor 204 connected to the second mechanical link 206. The second mechanical link 206 is in turn connected to the second wheel 200a of a steered end of the vehicle. The motor 204 is connected in signal communication with the electronic controller 300 by way of the signal path designated by the reference numeral 308 and is operative thereby to effect a change in the position of the electromechanical actuator 202. Such a change in position of the electromechanical actuator 202, in turn, causes a change in position of the second wheel 200a.

The second subsystem 200 further includes first and second redundant sensors 208 for measuring the position of the electro-mechanical actuator 202 and the second mechanical link 206. The second redundant sensor 208 is connected to the electromechanical actuator 202 by fourth gear 208a and the first redundant sensor 208 is connected to the second mechanical link 206 by fifth gear 208b. The second redundant sensor 208 is in signal communication with the electronic controller 300 by the signal path designated by the reference numeral 208c and the first redundant sensor 208 is in signal communication with the electronic controller 300 by the signal path designated by the reference numeral 208d, and are each operative to measure the position of the electromechanical actuator 202 and the second mechanical link 206 and to provide such measurements to the electronic controller 300.

The electronic controller 300 is comprised of a master controller 302, a steering controller 304 and a fault detection controller 306. The master controller 302 is operative generally to monitor and control the state of the steer-by-wire system and more specifically to coordinate the functional operations of the steering controller 304 and the fault detection controller 306, as well as to receive a signal indicative of steering column position from the sensors 108.

The steering controller 304 is in signal communication firstly with the motor 106 for providing steering column torque assist and position control and secondly with the master controller 302. The steering controller 304 is operative to receive a signal indicative of steering column torque from motor 106 for providing steering column torque assist and position control and in response thereto to control the steering column torque and position, and to provide a signal indicative of such control to the master controller 302.

The fault detection controller 306 is in signal communication firstly with sensors 108, secondly with the motor 204 and thirdly with the master controller 302. The fault detection controller 306 is operative to receive a first signal indicative of steering column position from the sensors 108 and in response thereto to provide second and third signals as output directed firstly to the motor 204 and secondly to the master controller 302. The signal directed to the master controller 302 is to allow the master controller 302 to coordinate the operations of the steering controller 304 and the fault detection controller 306. The signal directed from the fault detection controller 306 to the motor 204 is such as to allow the motor 204 to control the position of the electromechanical actuator 202 and thus the position of the second mechanical link 206. By so controlling the position of the electromechanical actuator 202 and second mechanical link 206 the position of the second wheel 200a is thus controlled in response to a change in position of the steering column 102 or first mechanical link 104.

The fault detection controller 306 is in signal communication with the sensors 208 by the signal paths designated by the reference numerals 208c and 208d. The sensors 208 are operative to measure the position of the electromechanical actuator 202 and the second mechanical link 206 and to provide such measurements to the fault detection controller 306 thus allowing the fault detection controller 306 to further control the position of the electromechanical actuator 202 and the second mechanical link 206 in response to the position of the second wheel 200a.

Figure 3:
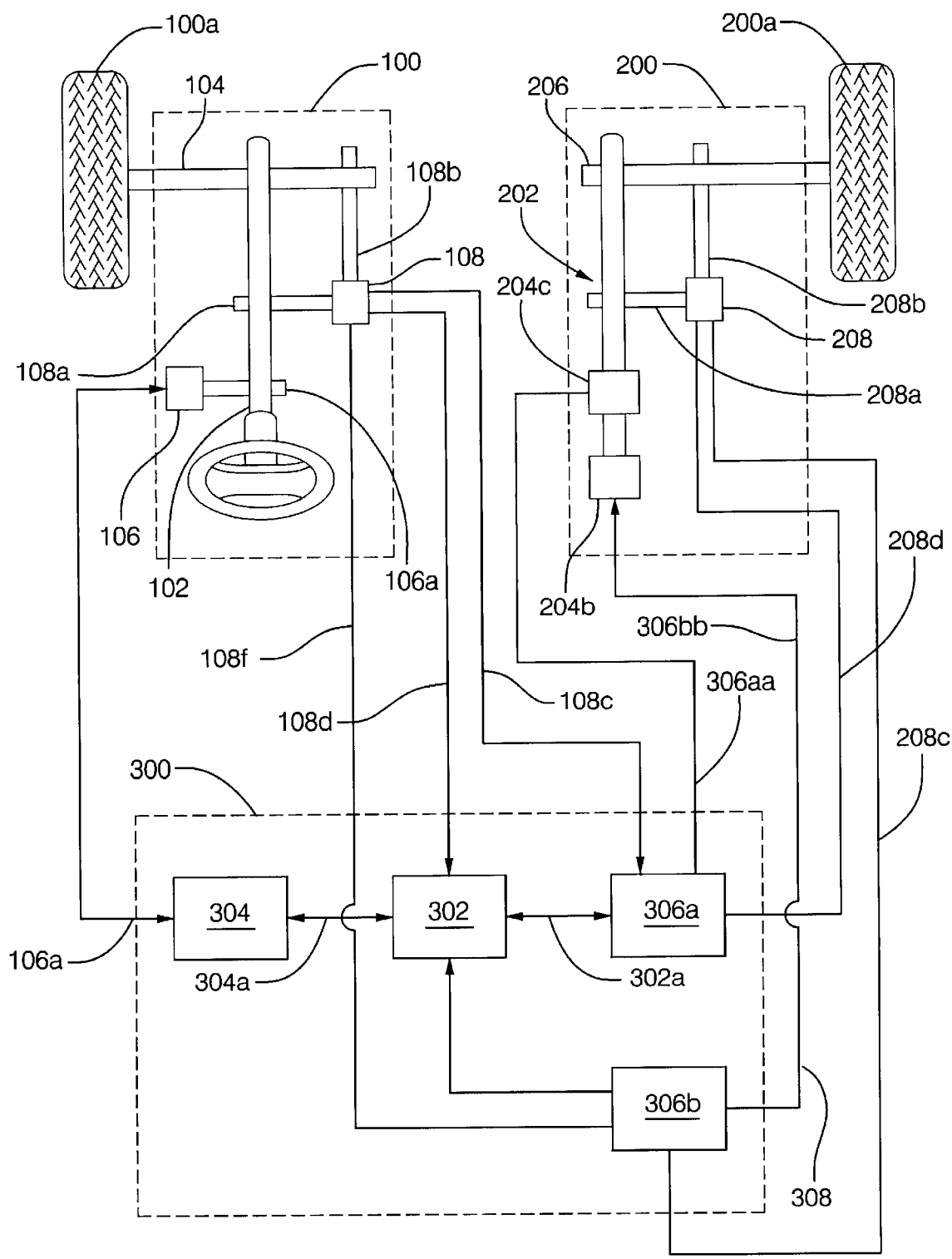
FIG. 3 is a schematic illustration of an alternate hybrid steer-by-wire system.

Turning now to FIG. 3, the redundancy of certain components of an alternate hybrid steer-by-wire system, indicated generally by the reference numeral 110, is shown. The redundancy of this alternate embodiment is shown firstly by a plurality of fault detection controllers 306a, 306b; and secondly by a plurality of motors 204a, 204b. The first fault detection controller 306a of the plurality of fault detection controllers is in signal communication firstly with the sensors 108, secondly with a first motor 204a of the plurality of motors, and thirdly with the master controller 302. The first fault detection controller 306a is operative to receive a first signal indicative of steering column position from the sensors 108, and in response thereto, to provide second and third signals as output directed firstly to the first motor 204a of the plurality of motors and secondly to the master controller 302.

The signal directed to the master controller 302 serves to allow the master controller 302 to coordinate the operations of the steering controller 304 and the first fault detection controller 306a of the plurality of fault detection controllers. The signal directed from the first fault detection controller 306a of the plurality of fault detection controllers to the first motor 204a of the plurality of motors is such as to allow the first motor 204a to control the position of the electromechanical actuator 202 and thus the position of the second mechanical link 206. By so controlling the position of the electromechanical actuator 202 and second mechanical link 206 the position of the second wheel 200a is thus controlled in response to changes in the positions of the steering column 102 and the first mechanical link 104.

The first fault detection controller 306a is in signal communication with the first redundant sensor 208 by the signal path designated by the reference numeral 208c and the second redundant sensor 208 is in signal communication with the master controller 302 by the signal path designated by reference numeral 208d. The sensors 208 are operative to measure either the position of the electromechanical actuator 202 or the second mechanical link 206 and to provide such measurement to the first fault detection controller 306a, thus allowing the first fault detection controller 306a to further control the position of the electromechanical actuator 202 and the second mechanical link 206 in response to the position of second wheel 200a.

The second fault detection controller 306b of the plurality of fault detection controllers and the second motor 204b of the plurality of motors are so arranged and connected within the hybrid system as to provide additional redundancy. In particular the second fault detection controller 306b of the plurality of fault detection controllers is in signal communication firstly with the sensors 108, secondly with a second motor 204b of the plurality of motors, and thirdly with the master controller 302. The second fault detection controller 306b is operative to receive a first signal indicative of steering column position from the sensors 108 and in response thereto to provide second and third signals as output directed firstly to the second motor 204b of the plurality of motors and secondly to the master controller 302. The signal directed to the master controller 302 is to allow the master controller 302 to coordinate the operations of the steering controller 304 and the second fault detection controller 306b of the plurality of fault detection controllers.

The signal directed from second fault detection controller 306b of the plurality of fault detection controllers to the second motor 204b of the plurality of motors is such as to allow the second motor 204b to control the position of the electro-mechanical actuator 202 and thus the position of the second mechanical link 206 by so controlling the position of the electromechanical actuator 202 and second mechanical link 206. The position of the second wheel 200a is thus controlled in response to a change in position of the steering column 102 or first mechanical link 104. The second fault detection controller 306b is in signal communication with the sensors 208 by way of the signal paths designated by the reference numerals 208d and 208e. The sensors 208 are operative to measure the position of the electromechanical actuator 202 or the second mechanical link 206 and to provide such measurement to the second fault detection controller 306b, thus allowing the second fault detection controller 306b to further control the position of the electro-mechanical actuator 202 and the second mechanical link 206 in response to the position of the second wheel 200a.

The first subsystem 100 is preferably located on the operator's or left side of the vehicle and includes an electric-assist steering column connected to a "half rack" manual rack and pinion steering gear via an intermediate shaft. The left end of the rack and pinion gear is connected to the chassis steering arm via a tie rod in a conventional manner. The second subsystem 200 is preferably located on the passenger's or right side of the vehicle and includes an electromechanical actuator that controls the position of the right-front wheel via a tie rod. The actuator is not mechanically connected to the left side rack and pinion or to the steering column. The actuator is powered electrically via the vehicle electrical system and controlled electronically via the electronic controller. As such, the system is part "steer-by-wire" and part direct mechanical link steering with electric assist.

Thus, based upon the forgoing description, a hybrid steer-by-wire and mechanical steering system is provided to control the position of a second wheel of a vehicle in response to the position of a steering column of the vehicle, which is normally indicative of the position of a first wheel of the vehicle.

The hybrid steer-by-wire system may be applied to more than two steered wheels of a vehicle. For example, a left front wheel might be controlled by the direct mechanically actuated subsystem, and the right front and both rear wheels might be controlled by the electromechanically actuated subsystem. Likewise, a hybrid steer-by-wire system may be applied to any vehicle having at least two wheels.

A hybrid steer-by-wire system may have interfaced control of individual wheel braking forces, as for example in a vehicle equipped with an electronic Automatic Braking System, and may also have interfaced control of an electronic throttle and an automatic transmission, where the vehicle is so equipped.

A hybrid steer-by-wire system provides significant benefits and advantages. First, the original equipment manufacturer gains some of the advantages of steer-by-wire while maintaining the simplicity and inherent robustness of conventional mechanical steering. The advantages of the steer-by-wire portion of the system include increased packaging flexibility, reduced vehicle assembly time, increased flexibility in vehicle control, e.g., "hands free" driving capability, and compatibility with an automated highway system. In addition, hybrid steer-by-wire provides for decreased vehicle development time, is engine independent, reduces fuel consumption and is environmentally friendly.

A hybrid steer-by-wire system maintains the advantages of steer-by-wire while allowing cost to be reduced by simplifying the steer-by-wire portion of the system. Less redundancy in the steer-by-wire system is required due to the presence of the conventional portion of the system. This reduces cost and complexity while increasing reliability because a direct mechanical link is still maintained with one front wheel. In addition, the components of this disclosure can be "flip-flopped" from one side of the vehicle to the other for easy left-hand drive and right-hand drive design and conversion.

A hybrid steer-by-wire system has a direct mechanical subsystem that is capable of maintaining control of the direct mechanically actuated road wheel even if the electromechanically actuated road wheel is not being adequately controlled, and a steer-by wire subsystem that is capable of maintaining control of the electro-mechanically actuated road wheel even if the direct mechanically actuated road wheel is not being adequately controlled.

Based upon the foregoing description, it will be apparent to one of ordinary skill in the pertinent art that various modifications and substitutions may be made thereto without departing from the true scope or spirit of the present disclosure. Accordingly, the appended claims shall be construed to cover all such modifications and substitutions that fall within the true scope and spirit of the disclosure.

What is claimed is:

1. A hybrid steer-by-wire and mechanical steering system for a vehicle having a steering wheel and first and second steered wheels, the system comprising:
   a first subsystem comprising a mechanical coupling between the steering wheel and the first steered wheel of the vehicle;
   a second subsystem comprising an actuator adapted to turn the second steered wheel of the vehicle; and
   an electronic controller adapted to receive information from the first subsystem indicative of the position of the steering wheel and to thereby control the actuator to turn the second steered wheel in accordance therewith, wherein the first and second steered wheels are located at the same end of the vehicle.

2. The system of claim 1 further comprising a first sensor for measuring steering column position coupled in signal communication to the controller.

3. The system of claim 2 wherein the second subsystem further comprises a second sensor for measuring the position of the actuator.

4. The system of claim 1 wherein the actuator is coupled to a second mechanical link adapted to turn the second wheel of the vehicle.

5. The system of claim 1, wherein the second subsystem further comprises at least a second actuator adapted to turn a third and fourth steered wheels of the vehicle, wherein the third and fourth steered wheels are located at an opposite end of the first and second steered wheels.

6. The system of claim 3 wherein the actuator comprises at least one motor.

7. The system of claim 6 wherein the electronic controller comprises:
   a master controller;
   a steering controller; and
   at least one fault detection controller.

8. The system of claim 7 wherein the at least one fault detection controller is in signal communication with the first sensor, the master controller, the at least one motor and the second sensor whereby the at least one fault detection controller is operative to receive a first signal from the first sensor, a second signal from the master controller and a third signal from the second sensor, and in response thereto to provide a fourth signal as output directed to the at least one motor and a fifth signal as output directed to the master controller so as to allow the at least one motor to control the position of the actuator.

9. The system of claim 2 further comprising a motor coupled to the first subsystem for providing torque assistance to the steering wheel of the vehicle.

10. The system of claim 9 wherein the motor provides position control of the first steered wheel of the vehicle for hands free operation of the vehicle.

11. The system of claim 9 wherein the electronic controller comprises:
    a master controller;
    a steering controller; and
    at least one fault detection controller.

12. The system of claim 11 wherein the steering controller is in signal communication with the master controller to provide steering column torque-assist and position control operative to control the motor to thereby provide steering torque-assist for the steering wheel and position control for automated steering of the first steered wheel for hands free operation of the vehicle.

13. The system of claim 11 wherein the master controller is in signal communication with the steering controller, the first sensor and the at least one fault detection controller, whereby the master controller is operative to receive a first signal from the first sensor, a second signal from the steering controller, and a third signal from the at least one fault detection controller and to thereby coordinate the functional operations of the steering controller and the at least one fault detection controller.

14. A method for steering a vehicle having first and second steered wheels, the method comprising:

mechanically coupling a steering wheel to the first steered wheel;

coupling an electric actuator to the second steered wheel, the actuator adapted to turn the second steered wheel of the vehicle;

turning the first steered wheel of the vehicle in direct correspondence with the position of the steering wheel;

receiving information indicative of at least one of the position of the steering wheel and the position of the first steered wheel; and commandedly signaling the electric actuator in accordance with the received information thereby controlling the actuator to turn the second steered wheel of the vehicle in accordance therewith, wherein the first and second steered wheels are located at the same end of the vehicle.

15. The method of claim 14, further comprising:

measuring the position of the actuator;

comparing the position of the actuator with the commanded signal to determine a difference signal; and controlling the second steered wheel in correspondence with the difference signal.

16. The method of claim 14, further comprising:

detecting a torque on the steering wheel; and providing an assist torque to at least one of the steering wheel and the first steered wheel responsive to the detected torque.

17. The method of claim 16, further comprising:

detecting a fault in the vehicle; and controlling the position of at least one of the first and second steered wheels in response to the detected fault.

18. The method of claim 14, further comprising:

receiving a hands free control signal; and controlling the positions of the first and second steered wheels in correspondence with the hands free control signal.

19. The method of claim 18, further comprising:

receiving a signal indicative of the torque applied to the steering wheel by a driver; and overriding the hands free control signal when the applied torque is greater than a threshold amount so that the driver may directly control the first and second steered wheels.

20. Means for controlling a hybrid steer-by-wire and mechanical steering system for a vehicle having a steering wheel and first and second steered wheels, comprising:

means for mechanically turning the first steered wheel of the vehicle in correspondence with the position of the steering wheel, the steering wheel being mechanically coupled to the first steered wheel;

means for receiving information indicative of the position of the steering wheel;

means for producing a control signal indicative of a desired position of the second steered wheel in response to the received information; and means for turning the second steered wheel in accordance with the produced control signal, wherein the first and second steered wheels are located at the same end of the vehicle.

* * * * *